United States Patent
Milden et al.

(10) Patent No.: US 11,373,130 B1
(45) Date of Patent: Jun. 28, 2022

(54) POLICY EXCEPTION RISK DETERMINATION ENGINE WITH VISUAL AWARENESS GUIDE

(71) Applicant: Wells Fargo Bank, N.A., San Francisco, CA (US)

(72) Inventors: Robert Milden, Waxhaw, NC (US); Timothy E. Carbery, Amherst, NH (US); Terri Christine Kennell, Jacksonville, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 78 days.

(21) Appl. No.: 16/890,730

(22) Filed: Jun. 2, 2020

Related U.S. Application Data (63) Continuation of application No. 15/294,190, filed on Oct. 14, 2016, now Pat. No. 10,679,167.

(51) Int. Cl.
*G06Q 10/06* (2012.01)

(52) U.S. Cl.
CPC ... *G06Q 10/06375* (2013.01); *G06Q 10/0635* (2013.01)

(58) Field of Classification Search
CPC .......................................... G06Q 10/00–50/00
USPC ................................ 705/7.11–7.42
See application file for complete search history.

(56) References Cited

U.S. PATENT DOCUMENTS

| | | | | |
|---|---|---|---|---|
| 5,999,918 A * | 12/1999 | Williams | ............ | G06Q 40/00 702/179 |
| 7,006,992 B1 * | 2/2006 | Packwood | ........... | G06Q 40/025 705/38 |
| 7,835,974 B2 * | 11/2010 | Burgis | .................. | G06Q 99/00 705/37 |
| 8,086,525 B2 * | 12/2011 | Atwood | ................ | G06Q 40/00 705/38 |
| 8,769,412 B2 * | 7/2014 | Gill | ...................... | G06F 21/577 709/224 |
| 9,195,955 B2 * | 11/2015 | Bonnard | ................. | G06N 5/02 |
| 9,589,242 B2 * | 3/2017 | Robinson | ............... | G06Q 10/06 |
| 10,019,677 B2 * | 7/2018 | Gill | ..................... | G06Q 10/067 |
| 10,679,167 B1 | 6/2020 | Milden et al. | | |
| 2003/0167191 A1 * | 9/2003 | Slabonik | ............... | G06Q 10/10 705/4 |
| 2004/0181665 A1 * | 9/2004 | Houser | ................. | G06Q 40/02 713/158 |
| 2004/0267660 A1 * | 12/2004 | Greenwood | ........ | G06Q 40/025 705/30 |
| 2007/0198401 A1 * | 8/2007 | Kunz | .................. | G06Q 40/025 705/38 |

(Continued)

*Primary Examiner* — Alan S Miller
(74) *Attorney, Agent, or Firm* — Womble Bond Dickinson (US) LLP (57) ABSTRACT

Assistance is provided to policy exception approvers that make decisions on whether to grant or deny policy exception requests. A determination can be made regarding an amount of impact associated with granting a policy exception request based on a comparison of conditions before and after policy enactment. The probability of an impact occurring can be determined as a result of granting the policy exception based on past impact occurrences. A risk rating can be computed as a function of the amount of impact and the probability of the impact, and a visual representation of the risk rating can be generated and displayed to the policy exception approvers.

15 Claims, 10 Drawing Sheets

(56) References Cited

U.S. PATENT DOCUMENTS

| | | | |
|---|---|---|---|
| 2009/0125427 A1* | 5/2009 | Atwood | G06Q 20/10 705/35 |
| 2010/0262444 A1* | 10/2010 | Atwal | G06Q 40/08 705/38 |
| 2011/0126111 A1* | 5/2011 | Gill | G06F 21/577 715/736 |
| 2012/0259752 A1* | 10/2012 | Agee | G06Q 40/00 705/35 |
| 2013/0073531 A1* | 3/2013 | Robinson | G06Q 10/06 707/694 |
| 2014/0324516 A1* | 10/2014 | Bonnard | G06N 5/02 705/7.27 |
| 2018/0069897 A1* | 3/2018 | Morris | H04L 63/20 |

* cited by examiner

| 502 | 504 | 506 | 508 |
| --- | --- | --- | --- |
| POLICY EXCEPTION | NEGATIVE OUTCOME? | LOSS INCURRED | EXCEPTION APPROVER? |
| xxxxxxxx | x | $400 | Approver A |
| xxxxxxxx |  | 0 | Approver B |
| xxxxxxxx | x | $10 | Approver B |
| xxxxxxxx |  | 0 | Approver A |
| xxxxxxxx |  | 0 | Approver C |
| xxxxxxxx |  | 0 | Approver D |
| xxxxxxxx |  | 0 | Approver E |
| xxxxxxxx | x | $1,000 | Approver A |
| xxxxxxxx |  | 0 | Approver B |
| xxxxxxxx |  | 0 | Approver A |
| xxxxxxxx |  | 0 | Approver B |
| xxxxxxxx |  | 0 | Approver E |
| xxxxxxxx | x | $5 | Approver D |
| xxxxxxxx |  | 0 | Approver C |
| xxxxxxxx | x | $100 | Approver B |

POLICY EXCEPTION RISK DETERMINATION ENGINE WITH VISUAL AWARENESS GUIDE

CROSS REFERENCE TO RELATED APPLICATIONS

This application is a continuation U.S. application Ser. No. 15/294,190, filed Oct. 14, 2016, and entitled "POLICY EXCEPTION RISK DETERMINATION ENGINE WITH VISUAL AWARENESS GUIDE." The entirety of this application is incorporated herein by reference.

BACKGROUND

Corporations and other institutions have policies in place to mitigate risk of harm and loss to the organization. The policies can range from network security and technology policies, to physical safety and human behavior policies. A policy in place that states that software downloads are forbidden without an administrator approval helps protect the company from unwanted and/or malicious software as well as unforeseen software conflicts. Similarly, a policy that states that bank branches must have a snow removal contract in place helps protect the organization from lawsuits over slips and falls during the winter. Adherence to these policies protects the organizations, but occasionally, there may be a need or desire to provide an exception for one or more policies. Sometimes the decision to grant the exception is a common sense decision, but other times it may be more nuanced, and the person authorized to grant the decision probably will not have all the information required to make the decision.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate providing information to assist policy exception approvers in making decisions on whether to grant or deny policy exception requests. The system disclosed herein takes in information about the policy and determines a risk level associated with granting the request and provides a color coded recommendation. Information that can be considered by the recommendation system includes loss associated with similar policy exception grants, the likelihood of loss occurring, and other contextual information about the operating environment. In an embodiment, if any of the information changes, the recommendation system can provide updated recommendations and or alerts.

For these considerations, as well as other considerations, in one or more embodiments, a system can include a memory to store computer-executable instructions and a processor, coupled to the memory, to facilitate execution of the computer-executable instructions to perform operations. The operations can include receiving information representing a policy exception request associated with a user account. The operations can also include determining a risk associated with the policy exception request, wherein the risk represents the risk associated with violation of a policy in response to granting the policy exception request. The operations can also include determining a probability of an impact occurring due to the risk. The operations can further include presenting a risk rating to an approver account, wherein the risk rating comprises information representing a function of the probability of impact occurring and an impact amount resulting from the risk occurring and comprises a visual coded risk level based on the risk rating.

In another embodiment, a method can include receiving, by a device comprising a processor, a policy exception request associated with a user account. The method can also include determining, by the device, a probability of a loss associated with the policy exception request, wherein the probability of loss represents a monetary loss associated with violation of a policy in response to granting the policy exception request. The method can also include determining, by the device, a monetary value of the loss. The method can also include transmitting, by the device, a risk rating to an approver account, wherein the risk rating comprises information representing a function of the probability of loss occurring and the monetary value and comprises a visual coded risk level based on the risk rating.

In another embodiment, a non-transitory computer-readable medium can comprise instructions that when executed by a computer processor perform operations including determining a risk associated with the policy exception request, wherein the risk represents the risk associated with violation of a policy in response to granting the policy exception request. The operations can also include determining a probability of a loss occurring due to the risk. The operations can further include presenting a risk rating to an approver account, wherein the risk rating comprises information representing a function of the probability of loss occurring and a loss amount resulting from the risk occurring and comprises a visual cue coded risk level based on the risk rating.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments, a policy exception risk determination system can be provided to assist an exception approver in determining whether a policy exception request should be granted or not. Policies are put in place by organizations in order to mitigate risk of a negative impact occurring due to a variety of events. Sometimes however, it may be necessary or desirable to temporarily suspend or provide an exception to a policy. In order to track such exceptions and to provide good governance, these policy exception requests must be approved by somebody. The person approving or denying the policy exceptions may not have the necessary information to assist in making this decision, and so the policy exception risk determination system disclosed here in can search for impact information associated with previous policy exceptions and take contextual information into account when providing recommendations. The recommendations can take the form of visual coded recommendations including colors, shapes, and/or patterns to easily and quickly convey information.

In an embodiment, a negative impact can be a monetary or fiscal loss. In other embodiments, an impact can be reputational, regulatory, human resource, and other forms of impact. It is to be appreciated that throughout the disclosure, where loss is disclosed, this can refer to any of the aforementioned negative impacts, and does not necessarily mean that loss is a monetary or financial loss.

Through a series of known data sources and values, this risk rating system will be able to risk rate the exception request, provide a color coded risk assessment (i.e. red for highest risk, yellow or green) and drill down capabilities to demonstrate the components that comprise the factors contributing to the risk rating. The system will also provide resources for additional information that the approver can consult prior to deciding on whether to approve the policy exception. Additionally, if desired, the risk rating can be demonstrated back to the requester to give an indication of the level of risk with their request. This may prompt the requester to withdraw their request and search for other methods that are within policy.

Building a cross-reference data model that shows the relationship of risk elements (i.e. policy, process, control, test scores, losses, issues (regulatory and internal), number of exceptions, etc.) and prioritizing based on the policy's area of focus, we can use current and historical data to risk rate a policy exception request. The indicator and corresponding drill down information will be presented systemically to the approver as part of the review request screen/process. An attestation and explanation field can be added to the approval process that ensures the approver has reviewed the information. Additionally policy owner and exception approver performance can be determined and used for performance feedback or secondary required approvals Contributing factors to risk ratings continually change. Through this system, alerts to policy owners and approvers of existing policy exceptions will be notified based on predefined thresholds and actions such as recertification/approval will be supported required actions.

Figure 1:
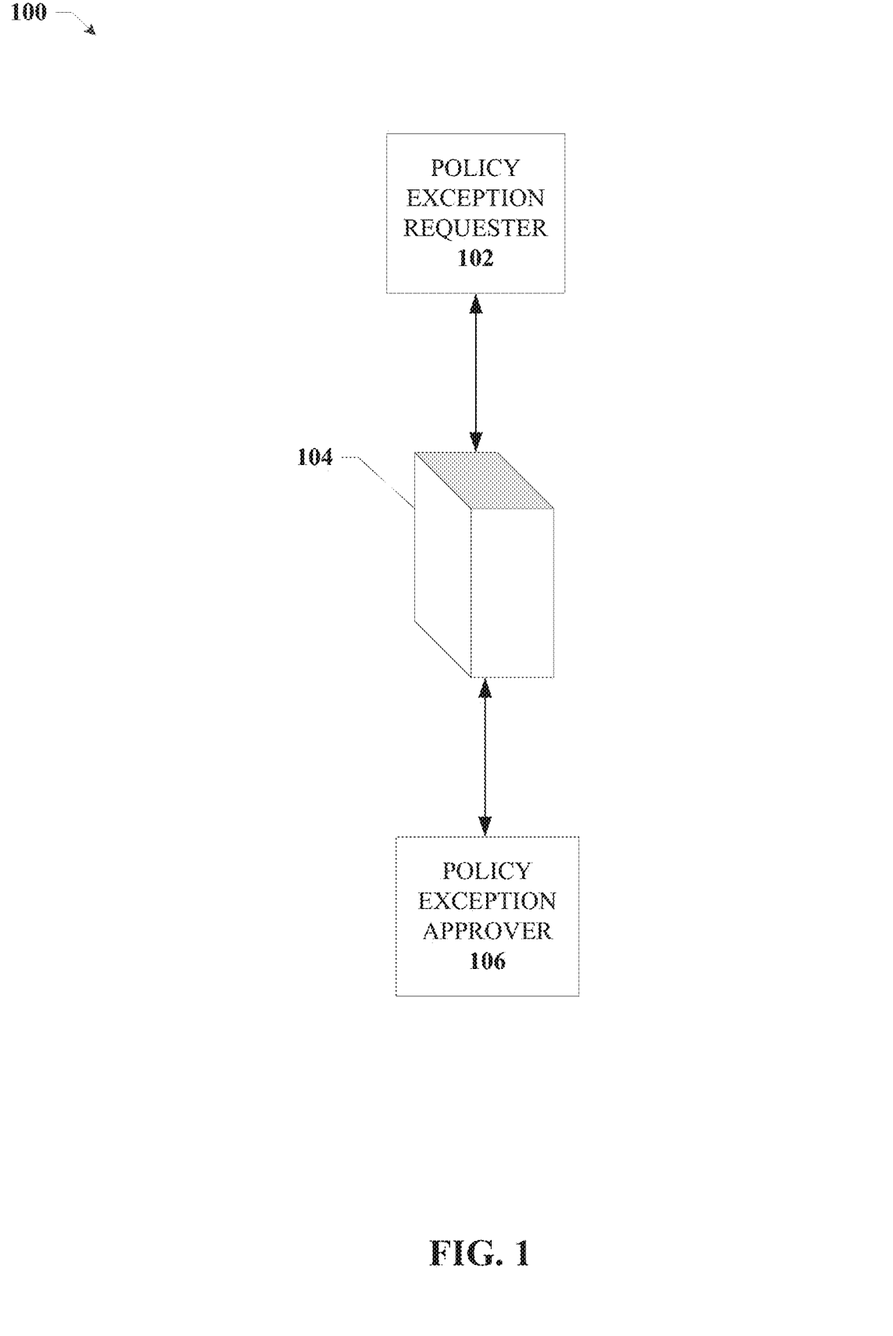
FIG. 1 is an illustration of an example system for providing risk ratings for policy exception requests in accordance with one or more aspects of the disclosure.

Turning now to FIG. 1, illustrated is an example system 100 for providing risk ratings for policy exception requests in accordance with one or more aspects of the disclosure. In the embodiment shown in FIG. 1, a risk rating system 104 can receive a policy exception request from a policy exception requester 102 which may be associated with a user account. The risk rating system 104 can determine a risk associated with the policy exception request, wherein the risk represents the risk associated with violation of a policy in response to granting the policy exception request. The risk can be the likelihood of a negative event or outcome due to the policy exception being granted. The risk rating system 104 can also determine the probability of a loss occurring due to the risk as well as determining the likely amount of loss occurring. The risk rating system 104 can then transmit and/or present a risk rating to a policy exception approver account 106, wherein the risk rating comprises information representing a function of the probability of loss occurring and a loss amount resulting from the risk occurring and comprises a visual coded risk level based on the risk rating.

In an embodiment, the risk rating can be based on both likelihood of a negative event occurring, and the estimated loss incurred due to the negative event occurring. As an example, if the likelihood that a negative event would occur is extremely high, but the amount of loss incurred would be very low, the risk rating may only be a medium rating. For another policy exception, if the probability of a negative event occurring is low, but the amount of loss incurred is very high, then the risk rating may be indicate a high risk. In an embodiment, the gain resulting from granting the policy exception can be considered when making the determination about whether the risk is high or low. For instance, if granting the policy exception saves "x" amount of dollars, and the amount of loss likely to be incurred is less than "x", then the policy exception risk rating can be low or medium. If on the other hand, the amount of loss likely to be incurred is "2x" then the policy exception risk rating can be high.

In order to easily convey the information contained in the risk rating, the risk rating system 104 can utilize a color coded scheme to communicate the risk ratings. Any agreed upon colors can be used, but in one embodiment, a red rating may indicate a high risk, or can indicate that loss is likely to occur and/or with high losses. A yellow rating can indicate a medium risk, or that loss may occur and or with low/medium losses. A green rating can indicate low risk, or that loss likely won't occur and/or with negligible losses.

When determining the risk involved in granting a policy exception, the risk rating system 104 can aggregate the probability of loss occurring and estimated loss over a predetermined time period. In an embodiment, the risk rating system 104 can calculate the estimated amount of loss resulting from granting the policy exception over a 5 or 10 year period. In other embodiments, the policy exception request can specify the time period for which the policy exception is requested. For instance, the policy exception requester 102 can specify that a policy exception is only requested for a one month period, or a one year period, or perhaps for a recurring period (e.g., the policy exception requester 102 requests a policy exception to be granted one day a week for a period of weeks or months).

In an embodiment, the risk rating system 104 can use financial and/or accounting systems in preparing the risk rating for policy exception approver 106. For instance, the risk rating system 104 can use general ledger information associated with the institution in determining how much loss has occurred due to similar policy exception grants. The risk rating system 104 can extract information from the general ledger to see the payments that have been made for payments associated with activities related to the policy. In other embodiments, the risk rating system 104 can look at periods before and after the policies were enacted to look at savings due to the policies in order to estimate how much the policy exception may cost. The risk rating system 104 can also narrow the search in the general ledger based on the scope of the policy exception that is being requested. As an example, if one business unit is requesting a policy exception, the risk rating system can determine the pre-policy costs and post-policy savings for the business unit in determining the estimated risk. This is because different business units may have vastly different activities that invite different types of risks and potential losses.

By way of example, if an institution has a policy that all employees must be covered with disability insurance, a first business unit that has more physical activities than a second business unit may have a higher risk than the second business unit if the first business unit is requesting an exception for the disability insurance policy. The risk rating system can send a high (e.g., red) risk rating to policy exception approver 106 for the first business unit while sending a medium (e.g., yellow) risk rating to the policy exception approver 106 for the second business unit.

In an embodiment, the risk rating system 104 can also use risk assessments prepared by other business units in the institution and by third parties when estimating the risk that may be incurred by granting a policy exception request. The institution may have completed a risk assessment when determining that a policy was required, and the risk rating system 104 can retrieve the risk assessment associated with the policy and use information in the policy exception request to determine the specific risk involved in granting this particular policy exception. The risk rating system 104 can also use annual implied loss which is based on overall enterprise risk assessment that uses inherent risk and residual risk which is the likelihood of having a loss associated with an event.

In other embodiments, the risk rating system 104 can use contextual information to determine the risk rating for the policy exception request. For instance, an institution may have a policy that bank branches or offices may require a snow removal contract to reduce the likelihood of litigation due to slips and falls. If the policy exception requester 102 is associated with a bank branch or office in Hawaii the risk rating system can cross reference the zip code or location of the requester 102 with weather data to determine that the policy exception would be low risk. The risk rating system 104 can examine weather data, calendar data, event information data, and other relevant contextual information. The risk rating system 104 can also incorporate information about government regulations and fines associated with the activities covered by the policy exception. If the policy exception request covers activities that span jurisdictions the risk rating system 104 can incorporate the regulations of different governments, local governments, state governments, country governments, and international regulations (by treaties, international organizations, UN, etc.).

In an embodiment, the risk rating system 104 can also provide updates on risk ratings for policy exceptions. If the risk rating system 104 provided a risk rating to the policy exception approver 106 and based on the risk rating, the policy exception approver 106 granted the policy exception, risk rating system 104 can provide an updated risk rating if any of the underlying details have changed that result in a changed risk or estimated loss amount. The risk rating system 104 can also provide a risk rating in case there is a new policy exception approver 106 or the person who previously granted the approval has changed positions or no longer works for the organization.

Figure 2:
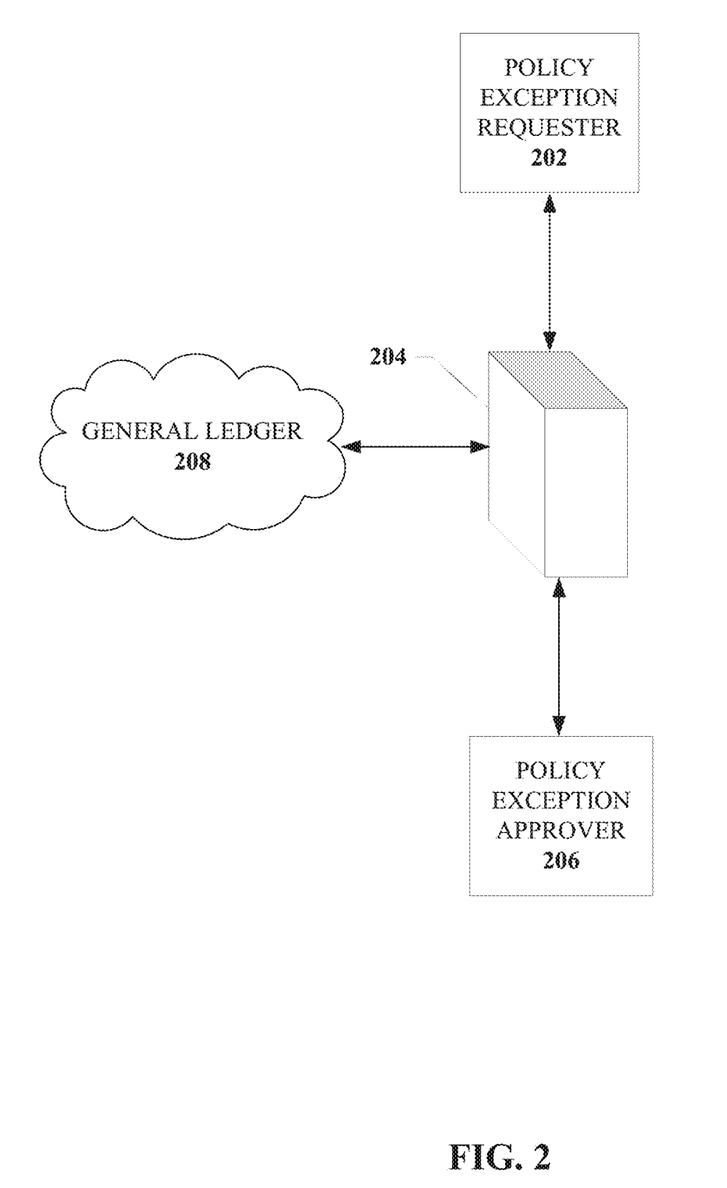
FIG. 2 is an illustration of an example system for providing risk ratings for policy exception requests using loss data in accordance with one or more aspects of the disclosure.

Turning now to FIG. 2, illustrated is an example system 200 for providing risk ratings for policy exception requests using loss data in accordance with one or more aspects of the disclosure.

In the embodiment shown in FIG. 2, a risk rating system 204 can receive a policy exception request from a policy exception requester 202 which may be associated with a user account. The risk rating system 204 can determine a risk associated with the policy exception request, wherein the risk represents the risk associated with violation of a policy in response to granting the policy exception request. The risk can be the likelihood of a negative event or outcome due to the policy exception being granted. The risk rating system 204 can also determine the probability of a loss occurring due to the risk as well as determining the likely amount of loss occurring. The risk rating system 204 can then transmit and/or present a risk rating to a policy exception approver account 206, wherein the risk rating comprises information representing a function of the probability of loss occurring and a loss amount resulting from the risk occurring and comprises a color coded risk level based on the risk rating.

In an embodiment, the risk rating system 204 can use financial and/or accounting systems in preparing the risk rating for policy exception approver 206. For instance, the risk rating system 204 can use loss data from a general ledger 208 associated with the institution in determining how much loss has occurred due to similar policy exception grants. The risk rating system 204 can extract information from the loss data in the general ledger 208 to see the payments that have been made for payments associated with activities related to the policy. In other embodiments, the risk rating system 204 can look at periods before and after the policies were enacted to look at savings due to the policies in order to estimate how much the policy exception may cost. The risk rating system 204 can also narrow the search in the general ledger 208 based on the scope of the policy exception that is being requested. As an example, if one business unit is requesting a policy exception, the risk rating system can determine the pre-policy costs and post-policy savings for the business unit in determining the estimated risk. This is because different business units may have vastly different activities that invite different types of risks and potential losses.

Figure 3:
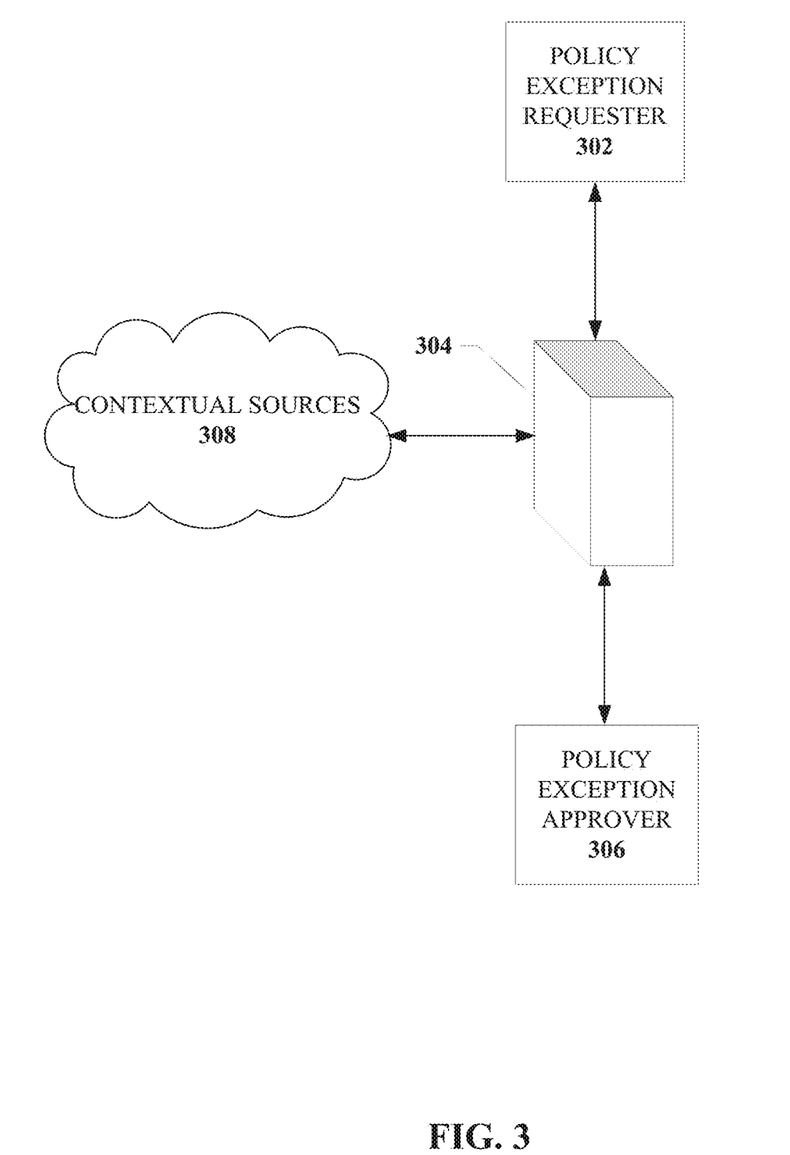
FIG. 3 is an illustration of an example system for providing risk ratings for policy exception requests using contextual data in accordance with one or more aspects of the disclosure.

Turning now to FIG. 3, illustrated is an example system 300 for providing risk ratings for policy exception requests using contextual data in accordance with one or more aspects of the disclosure.

In the embodiment shown in FIG. 3, a risk rating system 304 can receive a policy exception request from a policy exception requester 302 which may be associated with a user account. The risk rating system 304 can determine a risk associated with the policy exception request, wherein the risk represents the risk associated with violation of a policy in response to granting the policy exception request. The risk can be the likelihood of a negative event or outcome due to the policy exception being granted. The risk rating system 304 can also determine the probability of a loss occurring due to the risk as well as determining the likely amount of loss occurring. The risk rating system 304 can then transmit and/or present a risk rating to a policy exception approver account 306, wherein the risk rating comprises information representing a function of the probability of loss occurring and a loss amount resulting from the risk occurring and comprises a color coded risk level based on the risk rating.

The risk rating system 304 can use contextual information from various contextual sources 308 to determine the risk rating for the policy exception request. For instance, an institution may have a policy that bank branches or offices may require a snow removal contract to reduce the likelihood of litigation due to slips and falls. If the policy exception requester 302 is associated with a bank branch or office in Hawaii the risk rating system can cross reference the zip code or location of the requester 302 with weather data to determine that the policy exception would be low risk. The risk rating system 304 can examine weather data, calendar data, event information data, and other relevant contextual information. The risk rating system 304 can also incorporate information about government regulations and fines associated with the activities covered by the policy exception. If the policy exception request covers activities that span jurisdictions the risk rating system 304 can incorporate the regulations of different governments, local governments, state governments, country governments, and international regulations (by treaties, international organizations, UN, etc.).

The contextual information can also include risk assessments prepared by other business units in the institution and by third parties when estimating the risk that may be incurred by granting a policy exception request. The institution may have completed a risk assessment when determining that a policy was required, and the risk rating system 304 can retrieve the risk assessment associated with the policy and use information in the policy exception request to determine the specific risk involved in granting this particular policy exception. The risk rating system 304 can also use annual implied loss which is based on overall enterprise risk assessment that uses inherent risk and residual risk which is the likelihood of having a loss associated with an event.

Figure 4:
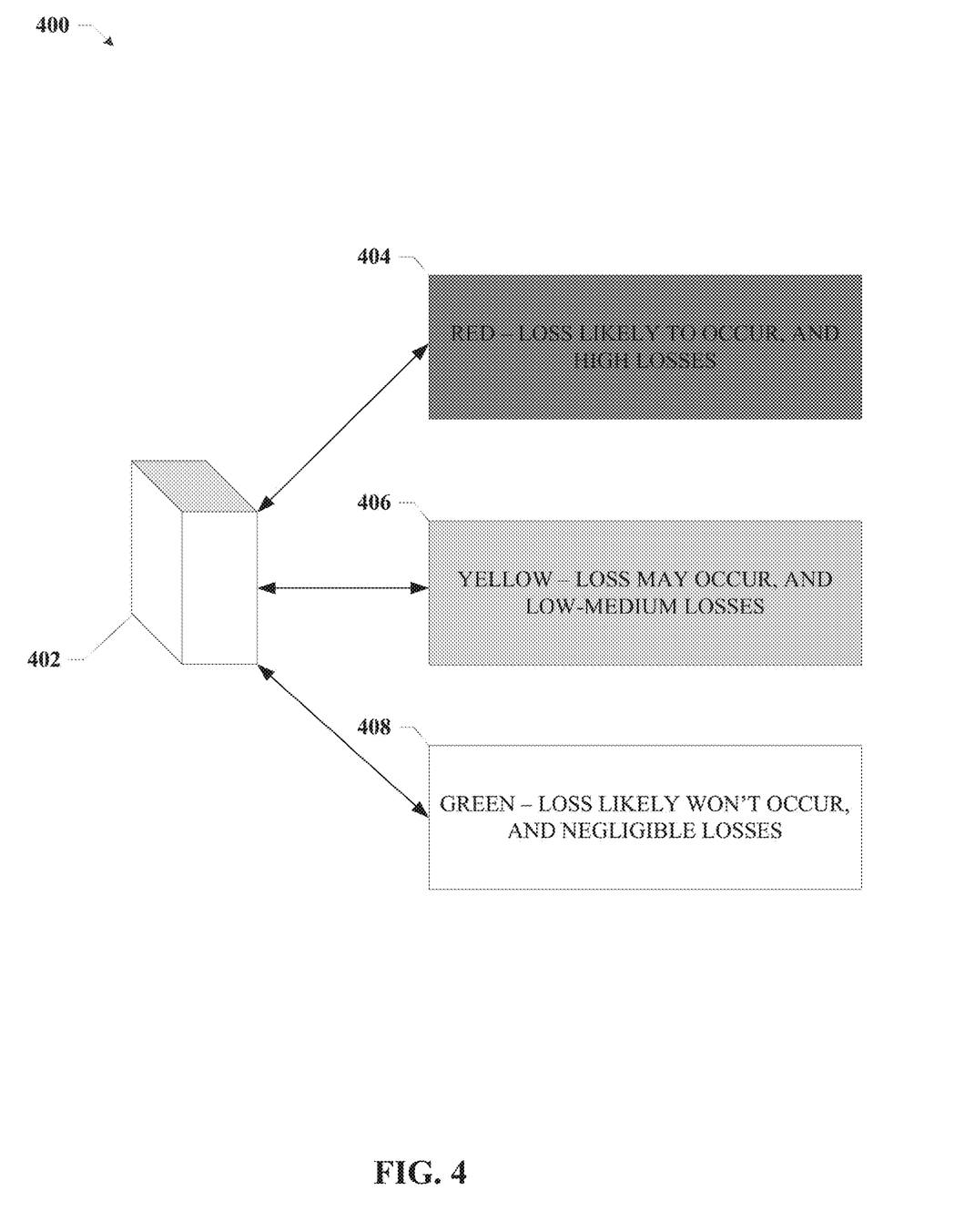
FIG. 4 is an illustration of an example system that provides color-coded risk ratings in accordance with one or more aspects of the disclosure.

Turning now to FIG. 4, illustrated is an example system 400 that provides color-coded risk ratings in accordance with one or more aspects of the disclosure In order to easily convey the information contained in the risk rating, the risk rating system 402 can utilize a color coded scheme to communicate the risk ratings. Any agreed upon colors can be used, but in one embodiment, a red rating 404 may indicate a high risk, or can indicate that loss is likely to occur and/or with high losses. A yellow rating 406 can indicate a medium risk, or that loss may occur and or with low/medium losses. A green rating 408 can indicate low risk, or that loss likely won't occur and/or with negligible losses.

These ratings can be sent by the risk rating system 402 to a device associated with the policy exception approver (e.g., 106, 206, 306, etc). The ratings can also include further contextual information that can assist the policy exception approver in making their decision about whether to approve or deny the policy exception request. This information can include details about people who have previously granted and/or denied requests. It can also include information about other policies that the policy exception requester has requested exceptions.

Figure 5:
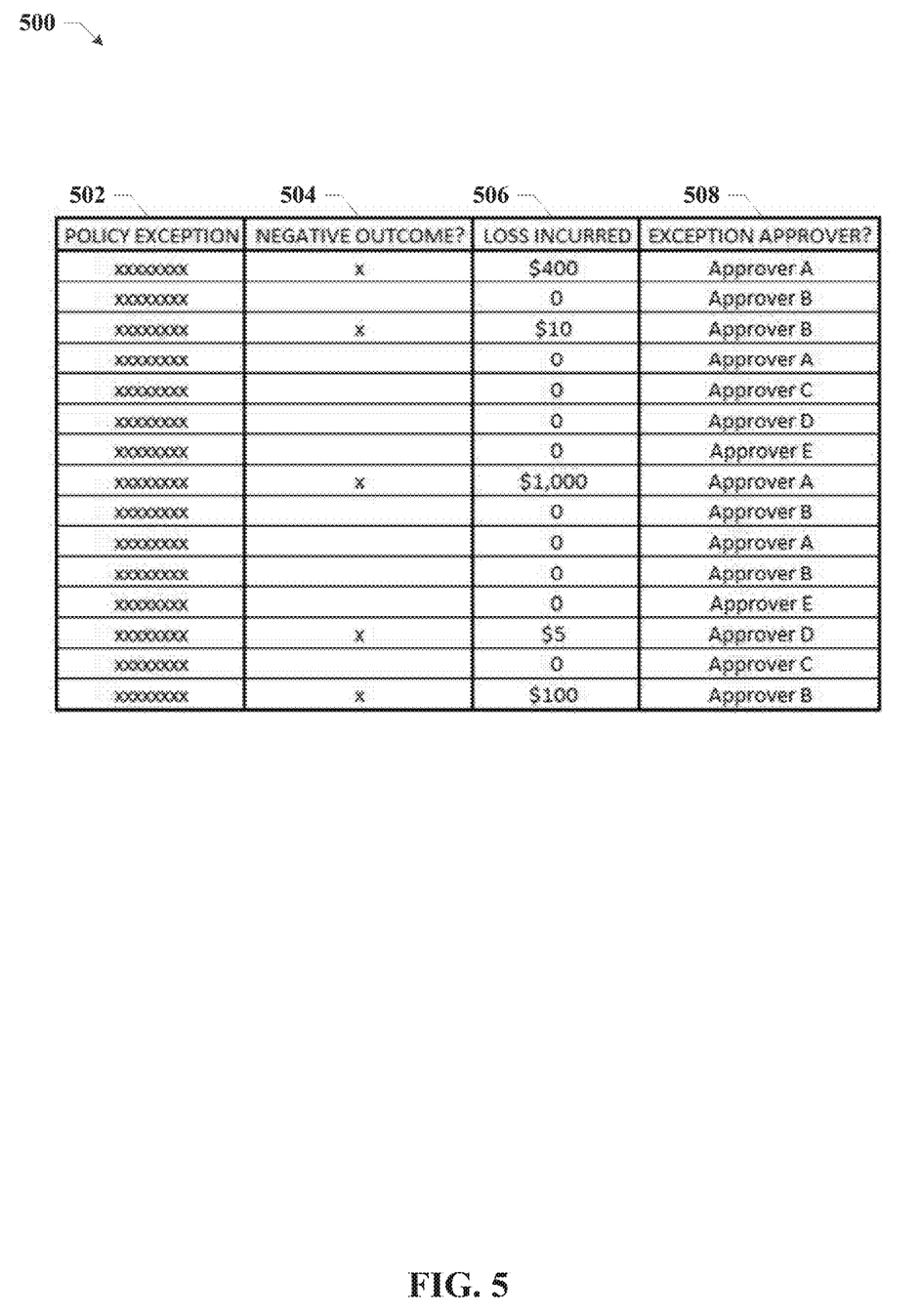
FIG. 5 is an illustration of an example chart showing similar granted policy acceptions and subsequent losses in accordance with one or more aspects of the disclosure.

Turning now to FIG. 5, depicted is an illustration of an example chart 500 showing similar granted policy acceptions and subsequent losses in accordance with one or more aspects of the disclosure.

The chart 500 can be transmitted and/or presented to the policy exception approver when transmitting the risk rating to provide additional contextual information for the approver. The policy exceptions 502 can be selected so that relevant and similar policy exceptions are being referenced and visible to the approver. The chart 500 can include information about whether there was a negative outcome 504 and the loss incurred 506 associated with the negative outcome 504. The chart can also include information about who the exception approvers 508 were at the time of the policy exception grant.

Figure 6:
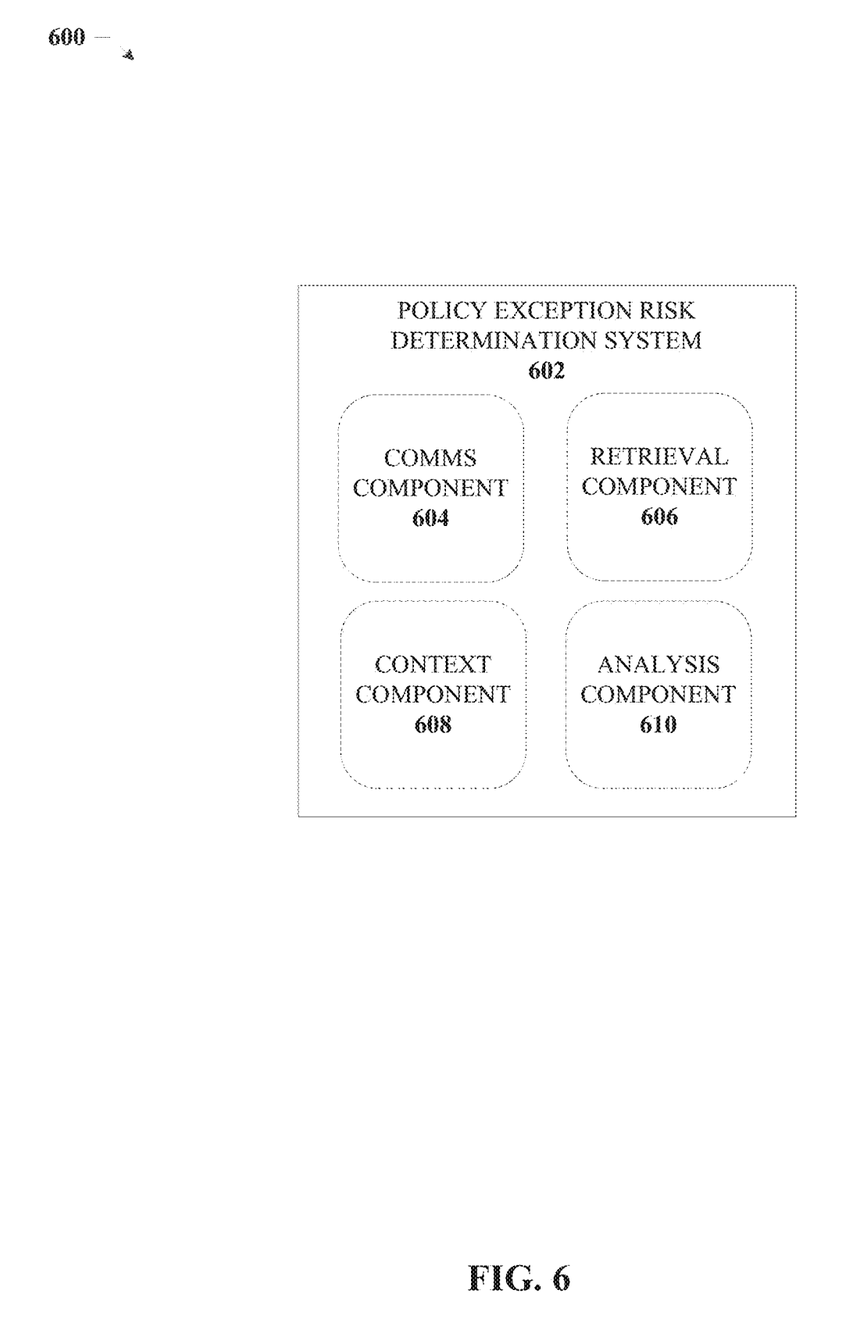
FIG. 6 is an illustration of an example policy exception risk determination system in accordance with one or more aspects of the disclosure.

Turning now to FIG. 6, illustrated is a system 600 with an example policy exception risk determination system 602 in accordance with one or more aspects of the disclosure.

A communications component 604 can receive a policy exception request from a policy exception requester. A retrieval component 606 can request information associated with the policy exception (e.g., from a general ledger, contextual sources, past performance of the approver, etc) and the contextual component 608 can examine the information retrieved by the retrieval component to develop a context for the policy exception request and the analysis component 610 can determine a risk and an estimate of loss based on the context and the policy exception request. The communications component 604 can then transfer the risk rating to the policy exception approver.

In an embodiment, the communications component 604 can receive an indication from the approver account that the risk rating has been approved and/or read and understood and the communications component 604 can send a notice of the grant of the policy exception to the requestor account. In other embodiments, the context component 608 can determine that the policy exception approver has not been successful in granting exceptions and/or is on probation. The communications component 604 can then transmit the risk rating to a second approver account for verification. It can be determined that the policy exception approver account has not been successful if previous policy exception approvals have resulted in losses above a predetermined threshold or above the savings gained from granting the exceptions. In other embodiments, the analysis component can terminate access granted based on granting the policy exception in response to the risk rating being increased.

Figure 7:
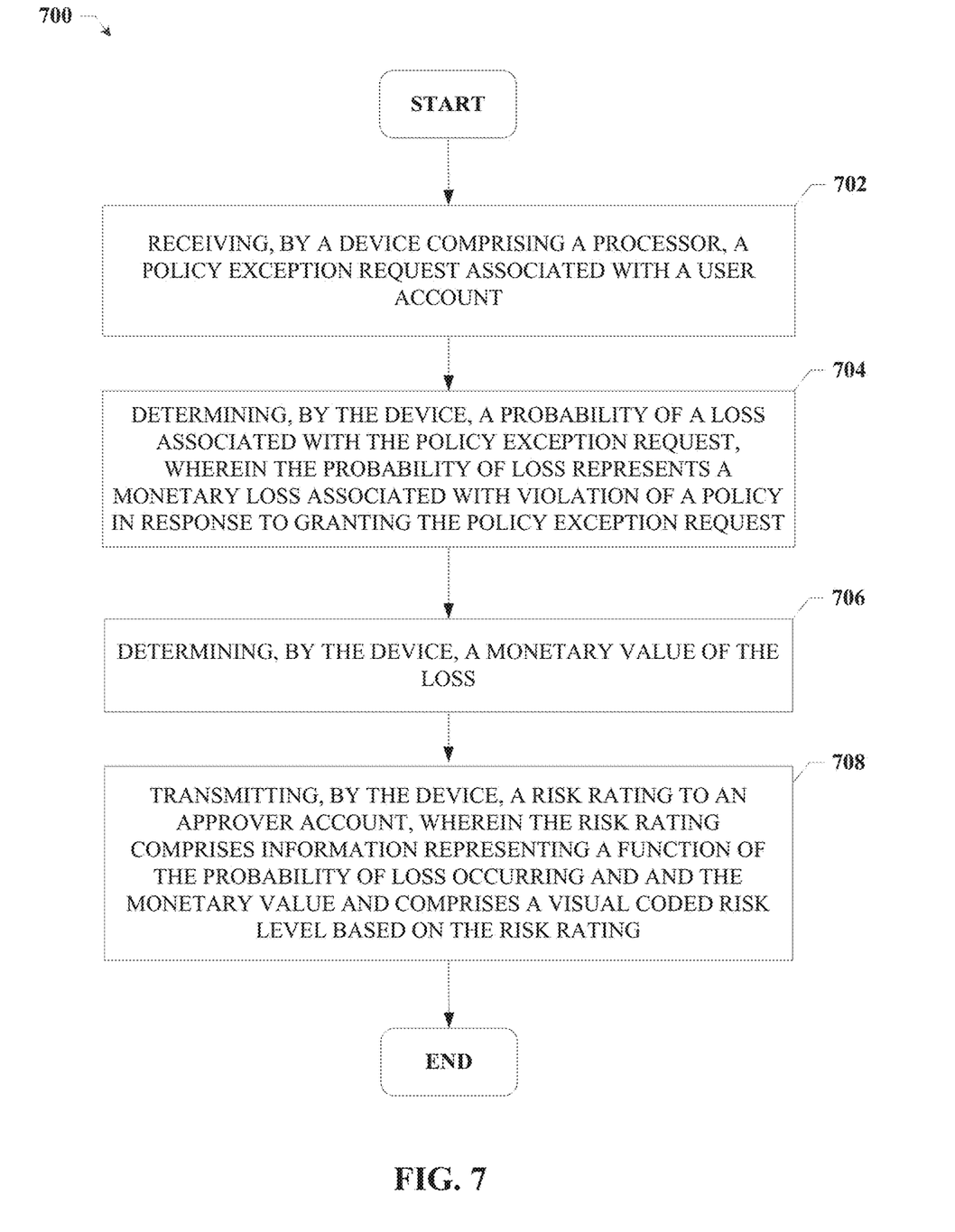
FIG. 7 is an illustration of an example flow chart of a method for providing risk ratings for policy exception requests according to one or more embodiments.
Figure 8:
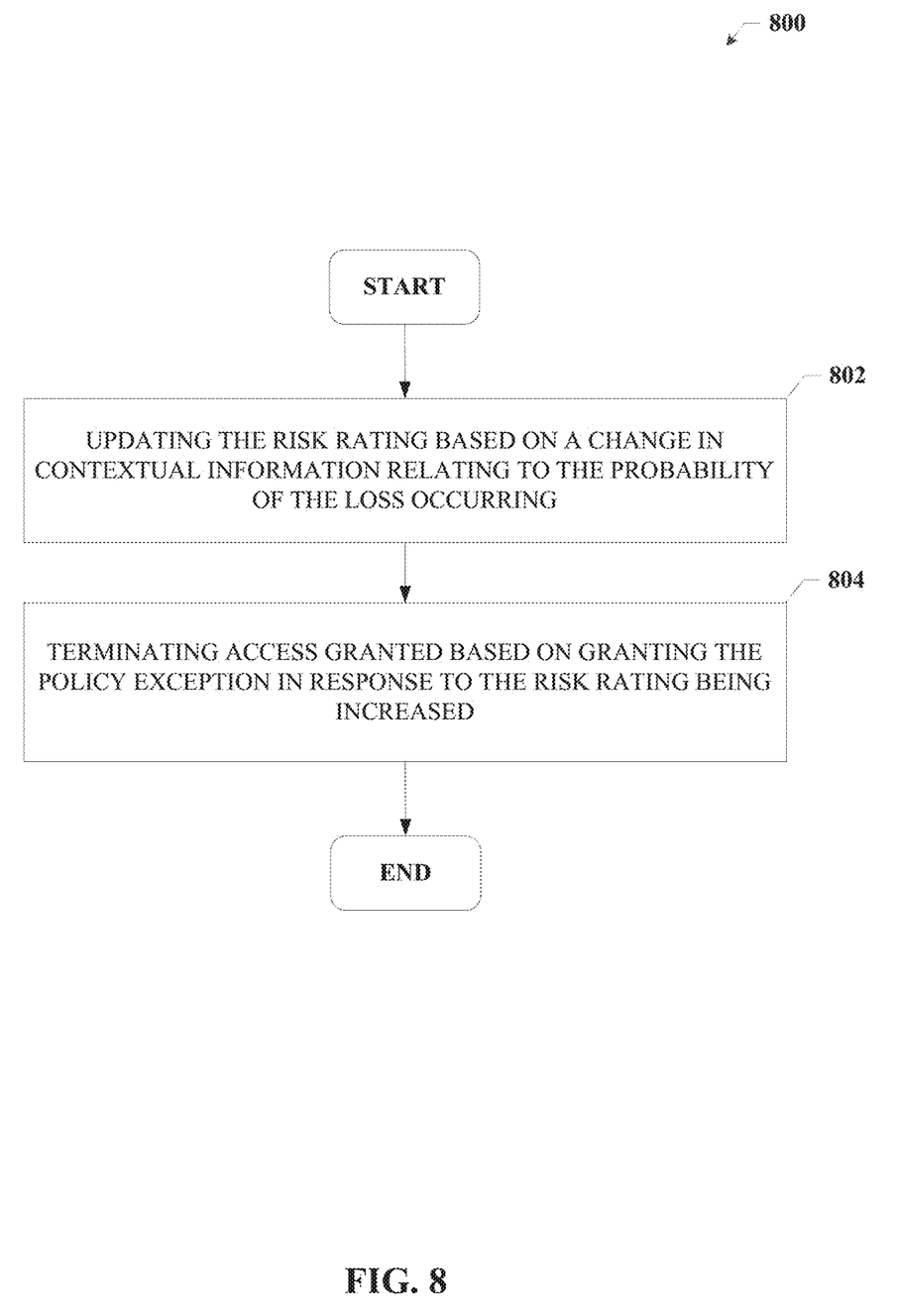
FIG. 8 is an illustration of an example flow chart of a method for providing risk ratings for policy exception requests according to one or more embodiments.

FIGS. 7-8 illustrate processes in connection with the aforementioned systems. The process in FIGS. 7-8 can be implemented for example by systems 100, 200, 300, 400, 500, and 600 illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example flow chart of a method 700 for providing risk ratings for policy exception requests according to one or more embodiments.

The method can start at 702, where the method includes receiving, by a device comprising a processor, a policy exception request associated with a user account.

At 704, the method includes determining, by the device, a probability of a loss associated with the policy exception request, wherein the probability of loss represents a monetary loss associated with violation of a policy in response to granting the policy exception request.

At 706, the method includes determining, by the device, a monetary value of the loss.

At 708, the method includes transmitting, by the device, a risk rating to an approver account, wherein the risk rating comprises information representing a function of the probability of loss occurring and the monetary value and comprises a visual coded risk level based on the risk rating. In an embodiment, the visual coded risk level can be a color code, or pattern or shape code, or any other visual cue that can be used to transmit information comprising levels of risk. For instance, in an embodiment, a low level risk can be communicated using a green check sign, while a high level risk can be communicated using a red stop sign. Other commonly used and understood visual cues are also possible.

Turning now to FIG. 8, illustrated is an example flow chart of a method 800 for providing risk ratings for policy exception requests according to one or more embodiments.

The method can start at 802, where the method includes updating the risk rating based on a change in contextual information relating to the probability of the loss occurring. At 804, the method includes terminating access granted based on granting the policy exception in response to the risk rating being increased Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

Figure 9:
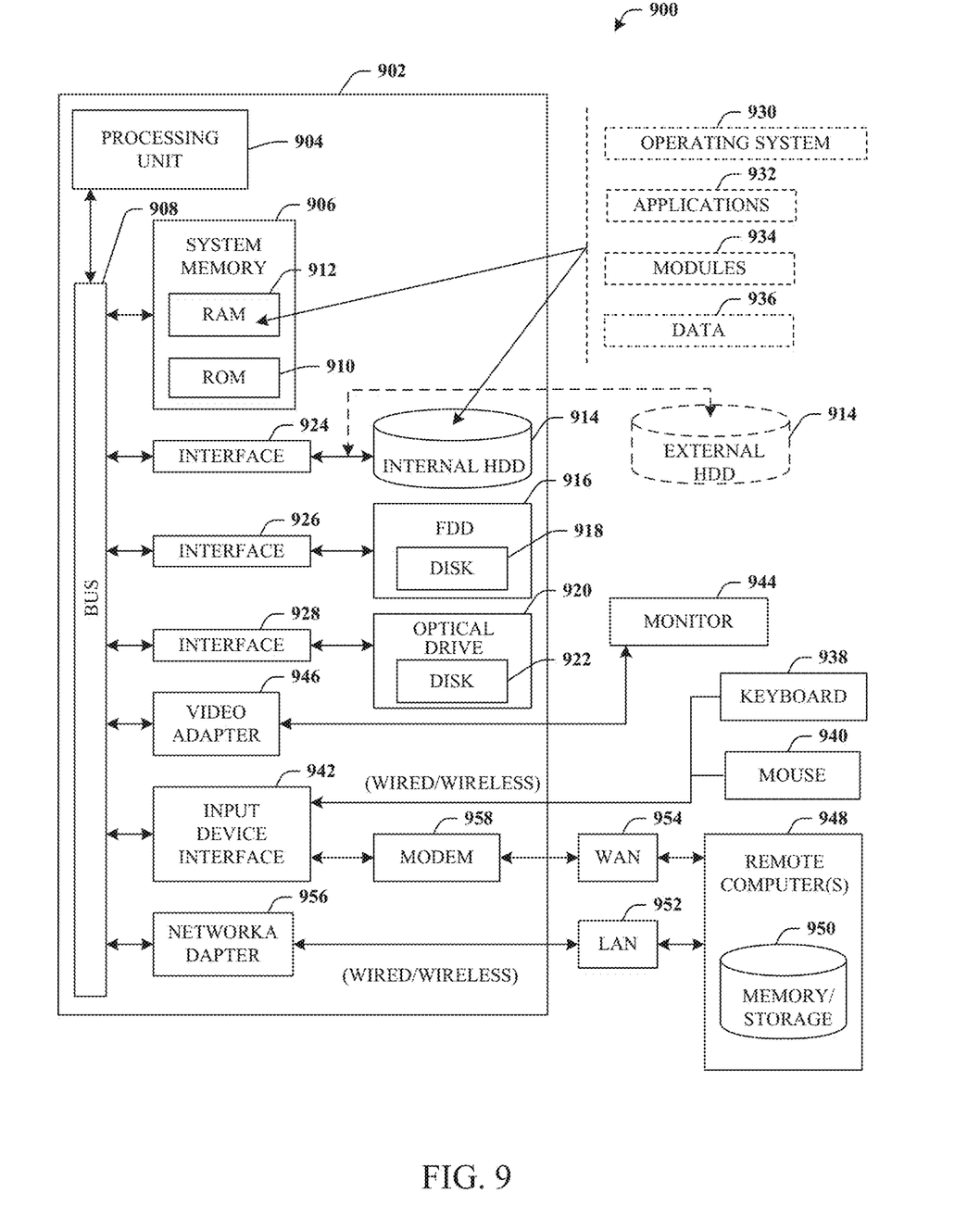
FIG. 9 is an illustration of an example computing environment where one or more of the provisions set forth herein are implemented, according to one or more embodiments.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
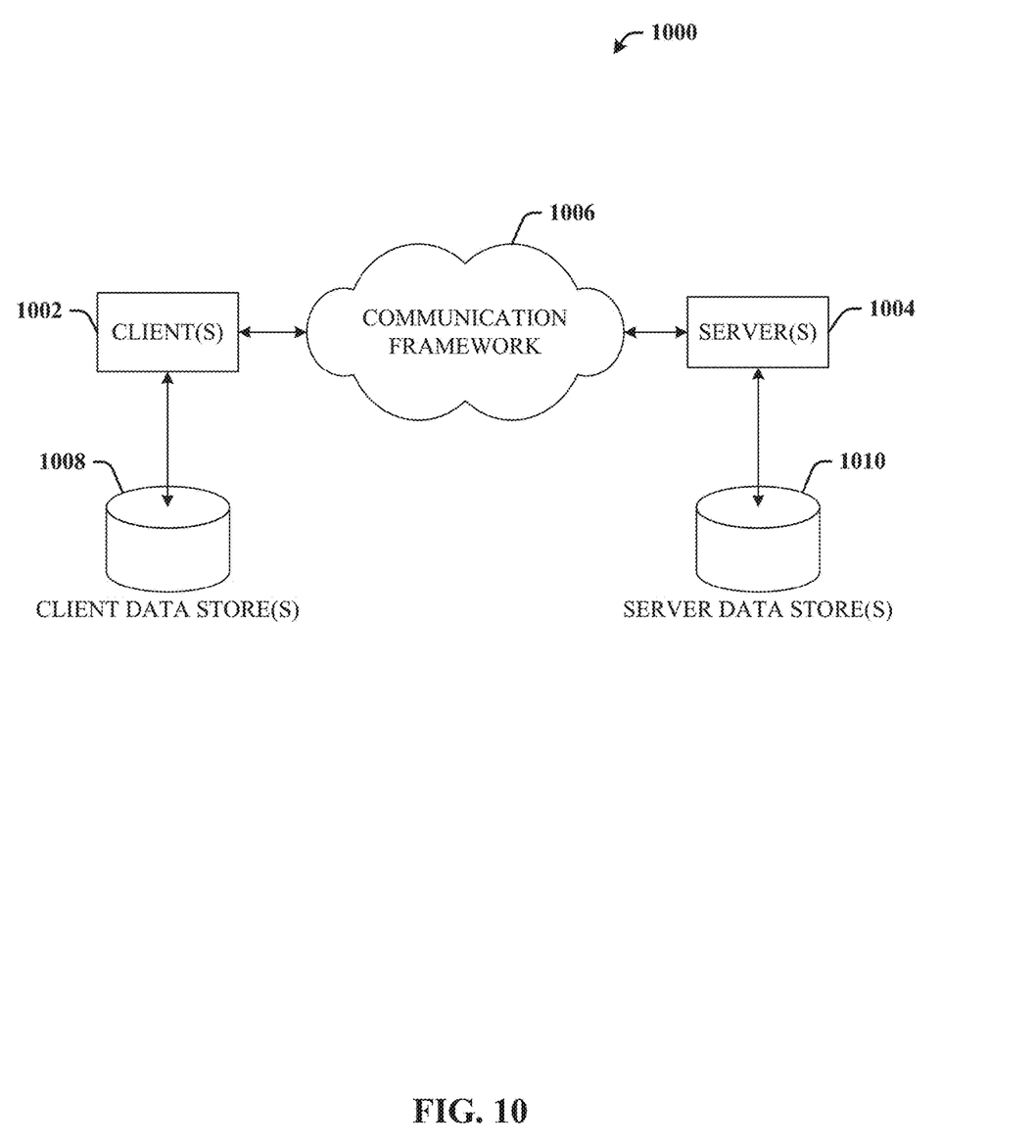
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor coupled to a memory that stores instructions that when executed by the processor cause the processor to:
determine an amount of impact associated with granting a policy exception request based on a comparison of conditions before and after policy enactment;
determine a probability of an impact occurring as a result of granting the policy exception request based on past impact occurrences;
compute a risk rating as a function of the amount of impact and the probability of the impact;
generate a visual representation of the risk rating;
transmit, for display on a display device, the visual representation;
update the risk rating based on a change in contextual information relating to the probability of the impact occurring; and
terminate access granted based on granting the policy exception request in response to the risk rating being increased.

2. The system of claim 1, wherein the instructions further cause the processor to determine the amount of impact based on an amount of impact attributed to prior policy exception grants.

3. The system of claim 2, wherein the prior policy exception grants are associated with different policies.

4. The system of claim 1, wherein the past impact occurrences are determined based on a general ledger of financial transactions.

5. The system of claim 1, wherein the instructions further cause the processor to transmit the visual representation to an approver account.

6. The system of claim 5, wherein the instructions further cause the processor to grant the policy exception request in response to receiving a confirmation from the approver account.

7. The system of claim 5, wherein the instructions further cause the processor to request additional approval from a second approver account based on past performance of the approver account in granting policy exception requests.

8. A method, comprising:
executing, on a processor, instructions that cause the processor to perform operations comprising:
determining an amount of impact associated with granting a policy exception request based on a comparison of conditions before and after policy enactment;
determining a probability of an impact occurring as a result of granting the policy exception request based on past impact occurrences;
computing a risk rating as a function of the amount of impact and the probability of the impact;
generating a visual representation of the risk rating;
conveying, for display on a display device, the visual representation;
updating the risk rating based on a change in contextual information relating to the probability of the impact occurring; and
terminating access granted based on granting the policy exception request in response to the risk rating being increased.

9. The method of claim 8, further comprising determining the amount of impact based on an amount of impact attributed to prior policy exception grants.

10. The method of claim 8, further comprising determining the probability of the impact based on an assessment of at least one of geography, local context, or regulations.

11. The method of claim 8, further comprising conveying the visual representation to an approver account.

12. The method of claim 11, further comprising granting the policy exception request in response to receiving a confirmation from the approver account.

13. The method of claim 11, further comprising requesting additional approval from a second approver account based on past performance of the approver account in granting policy exception requests.

14. A non-transitory computer-readable medium comprising instructions that, when executed by a processor, perform operations comprising:
- determining an amount of impact associated with granting a policy exception request based on a comparison of conditions before and after policy enactment;
- determining a probability of an impact occurring as a result of granting the policy exception request based on past impact occurrences;
- computing a risk rating as a function of the amount of impact and the probability of the impact;
- generating a visual representation of the risk rating;
- conveying the visual representation for display on a display device;
- updating the risk rating based on a change in contextual information relating to the probability of the impact occurring; and
- terminating access granted based on granting the policy exception request in response to the risk rating being increased.

15. The non-transitory computer-readable medium of claim 14, wherein the operations further comprise granting the policy exception request in response to receiving a confirmation from an approver account.

* * * * *